May 27, 1969
C. R. AMSLER ET AL
3,446,080
METHOD AND MEANS FOR REDUCING GYRO GIMBAL BEARING FRICTION
Filed Oct. 23, 1965
Sheet 1 of 2
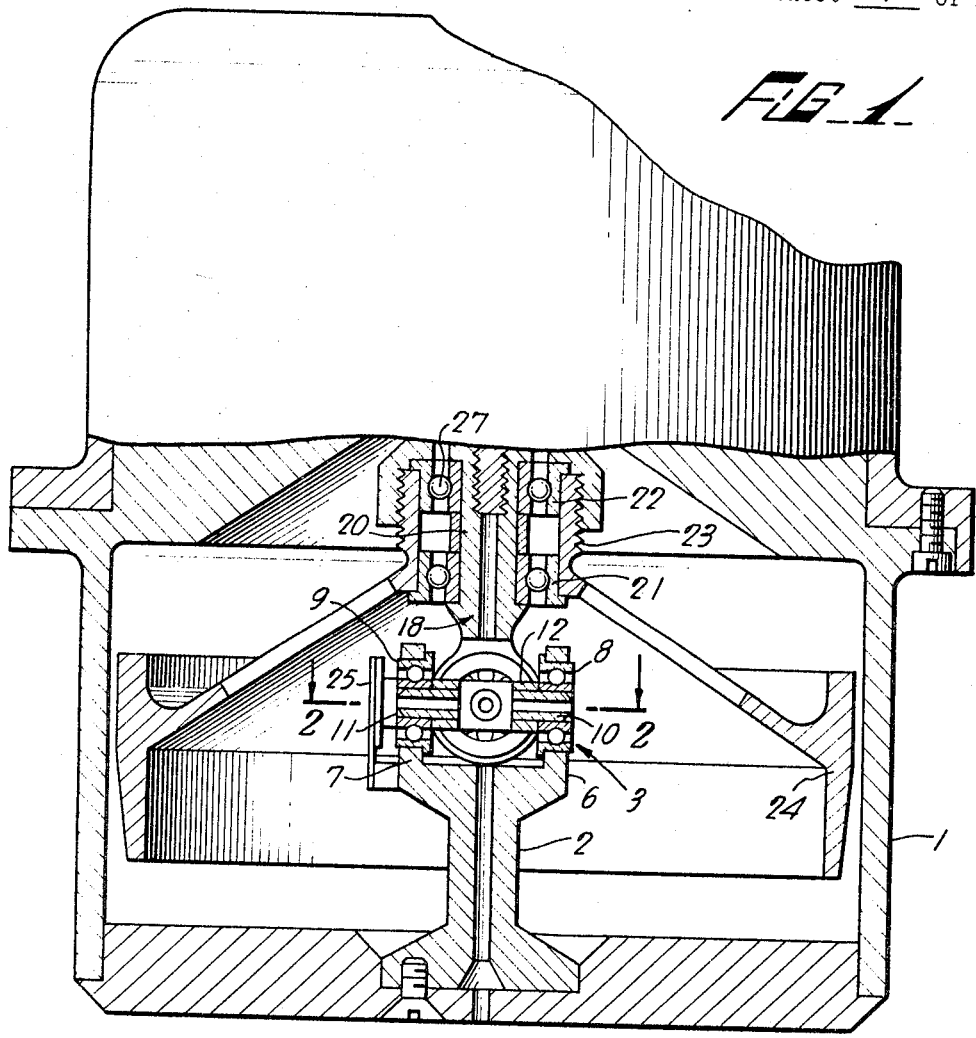
FIG_1
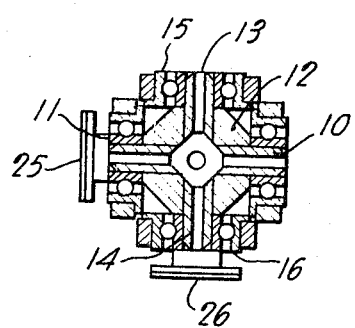
FIG_2
INVENTORS:
CLYDE R. AMSLER
EDGAR R. BRASTOW
RONALD F. LITTLE
ATTORNEY.

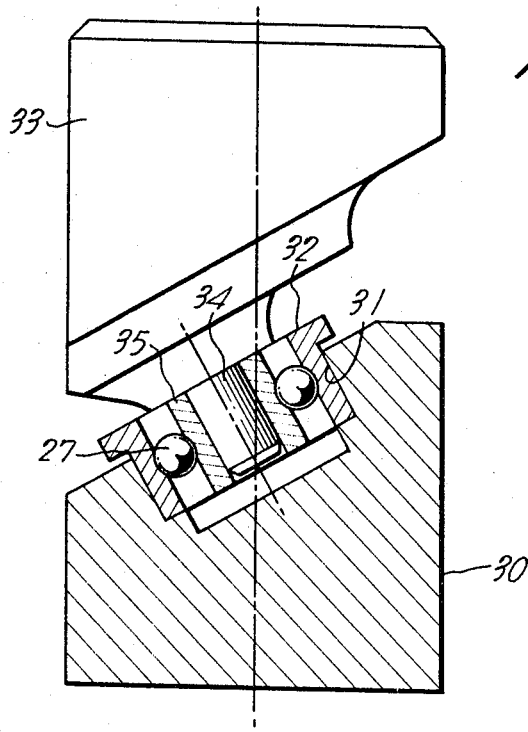
FIG_3_
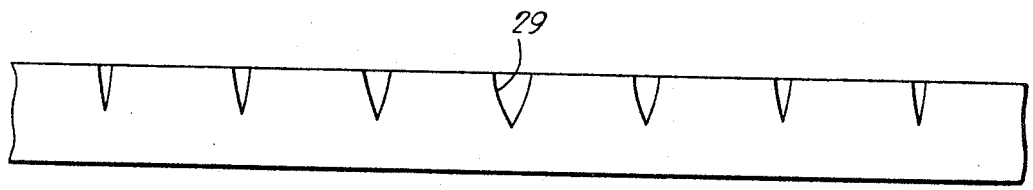
FIG_4_

United States Patent Office 3,446,080
Patented May 27, 1969

3,446,080
METHOD AND MEANS FOR REDUCING GYRO GIMBAL BEARING FRICTION
Clyde R. Amsler, Alhambra, Edgar R. Brastow, Woodland Hills, and Ronald F. Little, San Dimas, Calif., assignors to Clary Corporation, San Gabriel, Calif., a corporation of California
Filed Oct. 23, 1965, Ser. No. 503,615
Int. Cl. F16h 35/18
U.S. Cl. 74—5                                    9 Claims

ABSTRACT OF THE DISCLOSURE

The method of reducing friction in the gimbal system of a gyroscope in which the rotor is carried by the gimbal system through ball bearings, which comprises indenting the surfaces of the rotor bearing raceways to set up vibrations in the gimbal system.

---

This invention relates to gyroscopes and has particular reference to a method of and means for reducing the friction found in gyroscope gimbal systems, including bearings, pickoffs, slip rings and other such supporting and contacting elements.

The accuracy of a gyroscope used to indicate and/or control the attitude of a missile, airplane, or the like, is generally defined in terms of the amount of drift rate of the gyro spin axis. Such drift is caused mainly by the torque resulting from friction of the gimbal bearings and pickoffs which institutes a precession effect.

Heretofore, in order to obtain highly accurate gyroscopes with minimum drift tendencies, high precision ball bearings presenting a minimum of static and rolling friction were used in the rotor and gimbal systems and various methods were employed to further reduce to a minimum the friction found in such bearings. It was also considered best practice to select rotor bearings which caused a minimum of vibration.

One method of reducing bearing friction, and consequently drift, was to constantly rotate the races of two diametrically opposed gimbal bearings in opposite directions to cancel out the forces of friction in each bearing. Another method was to provide a bearing having an inner, a middle and an outer ball bearing race and to oscillate the middle race through gravity and acceleration.

In cases where the gimbal pickoffs, such as potentiometers, segmented commutator plates and the like are employed, the operational acceleration environments and the materials available impose frictional torque levels difficult to reduce while maintaining desired performance characteristics. Where these and similar sources of frictional torques are involved, improvement is insignificant by any other means than by the application of dynamic activation.

Prior art methods of reducing drift effects are generally elaborate, expensive and in many cases are not completely effective.

It therefore becomes a principal object of the present invention to reduce to a minimum the precessional effects resulting from friction developed in a gimbal system support for a gyroscope.

Another object is to provide an inexpensive method of and means for reducing the gimbal bearing friction and/or the gimbal pickoff friction of a gyroscope.

The manner in which the above and other objects of the invention are accomplished will be readily understood on reference to the following specification when read in conjunction with the accompanying drawings, wherein:

FIG. 1 is a view, partly in section, of a gyroscope constructed according to the present invention.

FIG. 2 is a sectional plan view through the gimbal section and is taken along line 2—2 of FIG. 1.

FIG. 3 is a view, partly in section, illustrating a tool for indenting the bearing races of a rotor bearing in accordance with the present invention.

FIG. 4 is a developed view, illustrating in exaggerated form, the indentations formed in one of the bearing races.

According to the present invention, it has been discovered that by minutely indenting the bearing races of one or more rotor bearings of a gyroscope and then integrally securing such races to the rotor and its support, a vibration of relatively high frequency and low amplitude is set up in the gimbal system which reduces to a minimum the static as well as rolling friction effects of the gimbal bearings and/or the friction of the gimbal pickoffs and thereby reduces considerably the drift effect of the gyroscope.

While the invention is described in connection with a particular gyroscope configuration, it is to be understood that it is adaptable to practically all gyroscope constructions which utilize roller type rotor bearings, such as balls.

Referring in particular to FIG. 1, the gyroscope shown therein comprises a cylindrical case 1 having secured thereto a central pedestal 2 which supports a universal gimbal system generally indicated at 3. The pedestal 2 forms a bifurcated yoke having two arms 6 and 7 supporting the outer races of two ball bearings 8 and 9, respectively. The inner races of the latter bearings support coaxially extending shaft sections 10 and 11 of a center block 12 which constitutes a gimbal and which has two additional coaxial shaft sections 13 and 14 (FIG. 2). The inner races of two additional ball bearings 15 and 16 are mounted on the shaft sections 13 and 14 and the outer races of such bearings are fitted within the arms of a second yoke member 18 forming a rotor supporto shaft 20.

The shaft sections 10 and 11 are perpendicular to the shaft sections 13 and 14 and to the spin axis of the shaft 20.

The inner races of two rotor support ball bearings 21 and 22 are fixed on the shaft section 20 and the outer races are fixed within the hub 23 of a gyroscope rotor 24.

It will be noted that the intersection of the gimbal axes formed by the gimbal shaft sections 10, 11, 13 and 14, and the spin axis coincides with the center of gravity of the rotor 24.

Suitable drive means (not shown) is mounted in the upper end of the case 1 to transmit rotation to the rotor 24. Such drive means may be either of the type capable of bringing the rotor up to operating speed and then disconnecting from the same to allow the rotor to coast during flight of the missile or aircraft or it may be of the type capable of transmitting a continuous drive torque to the rotor.

Means are provided for indicating the attitude of the gyroscope case 1 relative to the axis of the rotor during the operation of the gyroscope and for this purpose two potentiometer pickoff devices generally indicated at 25 and 26 are mounted on the gimbal support to indicate the relative position of the case about its two axes of movement.

According to the present invention, one or both of the rotor bearings 21 and 22 are formed with minute indentations in the inner and outer races thereof, as indicated in exaggerated form at 29 in FIG. 4, so that as the rotor rotates, the rotor balls 27, which are suitably held in spaced relation to each other, roll in and out of the indentations, causing a relatively high frequency and low amplitude vibration to be set up in the member 18 and the rest of the gimbal system which is transmitted to the various gimbal bearings 8, 9, 15 and 16 and pickoff wipers contacting potentiometers 25 and 26. Such vibration reduces to a minimum the static and rolling friction effects of the bearings and the static friction effects of the pickoffs.

FIG. 3 illustrates a tool for forming the above noted indentations in the bearing races. As shown, the tool comprises a base 30 having a socket 31 formed to receive the outer race 32 of a gimbal ball bearing and to support the same at an angle of approximately 30 degrees to the vertical. A ram 33 is formed, having a stud 34 over which is fitted the inner race 35 of the bearing.

Upon application of a sufficient impact force downwardly on the ram 33, the balls 27 will permanently indent the race surfaces of both races. Such indentations are shown in exaggerated form in FIG. 4 to consist of several indentations, the center one of which is of greatest depth, the others being of progressively less depth. The optimum size of such indentations depends upon the size of the bearing, the speed of the rotor, the construction of the gimbal system and other factors but it has been found that the best results for a gyroscope of normal size are obtained when the center or largest indentation is on the order of .0005 inch deep. On the other hand, the moment of inertia of the rotor is sufficient to damp out any vibrations induced therein so that its dynamic balance is not affected.

Since the indentations are of different depths, complex vibrations of different amplitudes are set up which tend to eliminate any detrimental resonant effects which might otherwise occur.

Also, it has been found desirable to form the indentations in the manner shown in FIG. 3 with the axis of the bearing held at approximately 30° to the vertical during indentation so that both radial as well as axial components of vibration will be transmitted to the gimbal bearings.

It has been discovered that to be fully effective, the rotor bearing races, or at least those races having indentations therein, must be firmly attached to the shaft section 20 and rotor hub 23, preferably by cementing the same in place so that the vibrations, even though of relatively small amplitude, will be adequately transmitted to the gimbal bearings.

It has also been discovered that by utilizing the above described method of inducing vibration in the gimbal bearings, mediocre ball bearings may be employed in both the rotor and gimbal sections with the same results as those obtained by use of high precision bearings and that such results are superior to those obtained by using high precision bearings in which no self-induced vibration feature is incorporated.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. The method of reducing friction in the gimbal bearings of a gyroscope having a gimbal system and including at least one roller bearing supported by said gimbal system for rotatably supporting a rotor for rotation about a spin axis,
  said roller bearing comprising a pair of raceways and a plurality of rolling elements between said raceways,
  which comprises indenting the surface of at least one of said raceways at spaced points located lengthwise of said raceway so that said rolling elements set up vibrations in said gimbal system during rotation of said rotor.

2. The method of reducing friction in the gimbal bearings of a gyroscope having a gimbal system and including at least one ball bearing supported by said gimbal system for rotatably supporting a rotor for rotation about a spin axis,
  said ball bearing comprising a pair of raceways,
  which comprises indenting the surface of at least one of said raceways at spaced points located lengthwise of said raceway so that the balls of said bearing set up vibration in said gimbal system during rotation of said rotor.

3. The method of reducing friction in the gimbal bearings of a gyroscope having a gimbal system and including at least one ball bearing supported by said gimbal system for rotatably supporting a rotor for rotation about a spin axis,
  said bearing comprising a pair of raceways and a plurality of spaced balls in rolling engagement between said raceways;
  which comprises indenting the surfaces of said raceways at spaced points located lengthwise of said raceways to different depths whereby said balls set up vibrations of varying amplitude in said gimbal system during rotation of said rotor.

4. The method of reducing friction in the gimbal bearings of a gyroscope having a gimbal system and including at least one bearing supported by said gimbal system for rotatably supporting a rotor for rotation about a spin axis,
  said bearing comprising a pair of raceways and a plurality of regularly spaced balls between said raceways;
  which comprises forcing said balls to permanently indent the surfaces of said raceways whereby said balls set up vibrations in said gimbal system during rotation of said rotor.

5. The method of reducing friction in the gimbal bearings of a gyroscope having a gimbal system and including at least one bearing supported by said gimbal system for rotatably supporting a rotor for rotation about a spin axis,
  said bearing comprising a pair of raceways and a plurality of regularly spaced balls between said raceway;
  which comprises forcing said balls in a direction extending at an angle to the axis of said bearing to permanently indent the surfaces of said raceways whereby said balls set up radially and axially extending vibrations transmittable to said gimbal system during rotation of said rotor.

6. The method of reducing friction in the gimbal bearings of a gyroscope having a gimbal system and including at least one ball bearing supported by said gimbal system for rotatably supporting a rotor for rotation about a spin axis,
  said bearing comprising a pair of raceways,
  which comprises forcing a plurality of spaced indenting balls to permanently indent the surfaces of said raceways and thereafter replacing said indenting balls by load carrying balls having different spacings than said indenting balls whereby to set up vibrations in said gimbal system during rotation of said rotor.

7. A gyroscope comprising a gimbal system,
  said system including at least one bearing,
  a rotor support member supported by said gimbal system,
  a rotor, and
  a ball bearing carried by said support member for rotatably supporting said rotor,
  said ball bearing having a pair of raceways and a plurality of balls in rolling engagement with said raceways, and
  characterized in that said raveways contain a plurality of spaced indentations whereby said balls set up vibrations in said gimbal system during rotation of said rotor.

8. A gyroscope according to claim 7 wherein said indentations are of different depths.

9. A gyroscope comprising a gimbal system,
  said system including at least one bearing, a rotor support member supported by said gimbal system, a rotor, a ball bearing carried by said support member for rotatably supporting said rotor, said ball bearing having a pair of raceways and a plurality of balls in rolling engagement with said raceways, characterized in that said raceways contain a plurality of indentations spaced apart distances different than the spacings between said balls whereby said balls set up vibrations in said gimbal system during rotation of said rotor.

References Cited

UNITED STATES PATENTS

| | | | |
|---|---|---|---|
| 2,577,942 | 12/1951 | Agins | 74—5 |
| 2,649,808 | 8/1953 | Slater et al. | 74—5 |

C. J. HUSAR, *Primary Examiner.*

U.S. Cl. X.R.

308—1